(12) United States Patent
Nonoyama et al.

(10) Patent No.: US 10,346,108 B2
(45) Date of Patent: Jul. 9, 2019

(54) NON-TRANSITORY COMPUTER-READABLE MEDIUM STORING PROGRAM FOR COMMUNICATION APPARATUS, COMMUNICATION APPARATUS AND METHOD FOR CONTROLLING COMMUNICATION APPARATUS

(71) Applicant: BROTHER KOGYO KABUSHIKI KAISHA, Nagoya-shi, Aichi-ken (JP)

(72) Inventors: Makoto Nonoyama, Nagoya (JP); Hirotaka Asakura, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/887,200

(22) Filed: Feb. 2, 2018

(65) Prior Publication Data

US 2018/0225073 A1 Aug. 9, 2018

(30) Foreign Application Priority Data

Feb. 7, 2017 (JP) .................................. 2017-020527

(51) Int. Cl.
*G06F 3/12* (2006.01)
*H04W 76/19* (2018.01)
(Continued)

(52) U.S. Cl.
CPC .......... *G06F 3/1236* (2013.01); *G06F 3/1204* (2013.01); *G06F 3/1292* (2013.01); *H04N 1/00103* (2013.01); *H04N 1/00342* (2013.01); *H04N 1/00408* (2013.01); *H04N 1/00477* (2013.01); *H04W 76/14* (2018.02); *H04W 76/19* (2018.02); *H04N 2201/006* (2013.01); *H04N 2201/0046* (2013.01);
(Continued)

(58) Field of Classification Search
None
See application file for complete search history.

(56) References Cited

U.S. PATENT DOCUMENTS

2012/0320413 A1* 12/2012 Nagasaki ............... H04W 8/005
 358/1.15
2014/0213190 A1* 7/2014 Yamaoka ............... G06F 3/1204
 455/41.3
2015/0092231 A1* 4/2015 Shibata ................. H04W 76/36
 358/1.15

OTHER PUBLICATIONS

Wi-Fi Peer-to-Peer (P2P) Technical Specification Version 1.5.

* cited by examiner

*Primary Examiner* — Huo Long Chen
(74) *Attorney, Agent, or Firm* — Scully, Scott, Murphy & Presser, P.C.

(57) ABSTRACT

A non-transitory computer-readable medium storing a computer program readable by a computer of a communication apparatus, the computer program causing the communication apparatus to: when first trigger information for establishing first wireless connection is received, supply a first connection instruction to a first wireless interface and store device information into a memory; when second trigger information is received, supply a second connection instruction to the first wireless interface; and in a specific case where it is not possible to re-establish first wireless connection with the external apparatus, display, on a display, display information for re-establishing the first wireless connection with the external apparatus. The display information includes first display information in case the device information is first device information, and second display information in case the device information is second device information.

12 Claims, 8 Drawing Sheets

(51) Int. Cl.
*H04W 76/14* (2018.01)
*H04N 1/00* (2006.01)
(52) U.S. Cl.
CPC ............... *H04N 2201/0072* (2013.01); *H04N 2201/0094* (2013.01); *H04N 2201/0096* (2013.01)

NON-TRANSITORY COMPUTER-READABLE MEDIUM STORING PROGRAM FOR COMMUNICATION APPARATUS, COMMUNICATION APPARATUS AND METHOD FOR CONTROLLING COMMUNICATION APPARATUS

CROSS-REFERENCE TO RELATED APPLICATION

This application claims priority from Japanese Patent Application No. 2017-020527 filed on Feb. 7, 2017, the entire subject-matter of which is incorporated herein by reference.

TECHNICAL FIELD

The disclosure relates a technology for re-establishing wireless connection between a communication apparatus and an external apparatus.

BACKGROUND

In a communication system including a communication apparatus and an external apparatus, a technology for establishing wireless connection between the communication apparatus and the external apparatus has been known.

SUMMARY

The disclosure provides a technology that, after wireless connection between a communication apparatus and an external apparatus is disconnected, can appropriately re-establish the wireless connection.

According to one illustrative aspect of the disclosure, there may be provided a non-transitory computer-readable medium storing a computer program readable by a computer of a communication apparatus, the computer program, when executed by the computer, causing the communication apparatus to perform operations comprising: in response to receiving first trigger information for establishing first wireless connection with an external apparatus in accordance with a first wireless communication method, supplying, to a first wireless interface, a first connection instruction for establishing the first wireless connection with the external apparatus; in response to receiving the first trigger information, storing device information relating to the external apparatus into a memory of the communication apparatus; in response to receiving second trigger information for re-establishing the first wireless connection with the external apparatus after the first wireless connection is disconnected, supplying, to the first wireless interface, a second connection instruction for re-establishing the first wireless connection with the external apparatus; in a specific case where it is not possible to re-establish the first wireless connection with the external apparatus even though the second connection instruction is supplied to the first wireless interface, displaying, on a display of the communication apparatus, display information for re-establishing the first wireless connection with the external apparatus, wherein the displaying of the display information comprises: in a case where the device information in the memory is first device information, displaying, on the display, first display information that is the display information indicative of a first method for re-establishing the first wireless connection with the external apparatus; and in a case where the device information in the memory is second device information that is different from the first device information, displaying, on the display, second display information that is the display information indicative of a second method for re-establishing the first wireless connection with the external apparatus, the second method being different from the first method.

According to the above configuration, in the specific case where it is not possible to re-establish the first wireless connection between the communication apparatus and the external apparatus, in the case where the device information in the memory is the first device information, the communication apparatus displays the first display information, which indicates the first method for re-establishing the first wireless connection with the external apparatus, and in the case where the device information in the memory is the second device information, the communication apparatus displays the second display information, which indicates the second method for re-establishing the first wireless connection with the external apparatus. Therefore, a user can see the first or second display information. As a result, after the first wireless connection between the communication apparatus and the external apparatus is disconnected, it is possible to appropriately re-establish the first wireless connection.

A non-transitory computer-readable recording medium storing the computer program, the communication apparatus and a method for controlling the communication apparatus are also novel and useful. In addition, a communication system including the communication apparatus and the external apparatus is also novel and useful.

Figure 1:
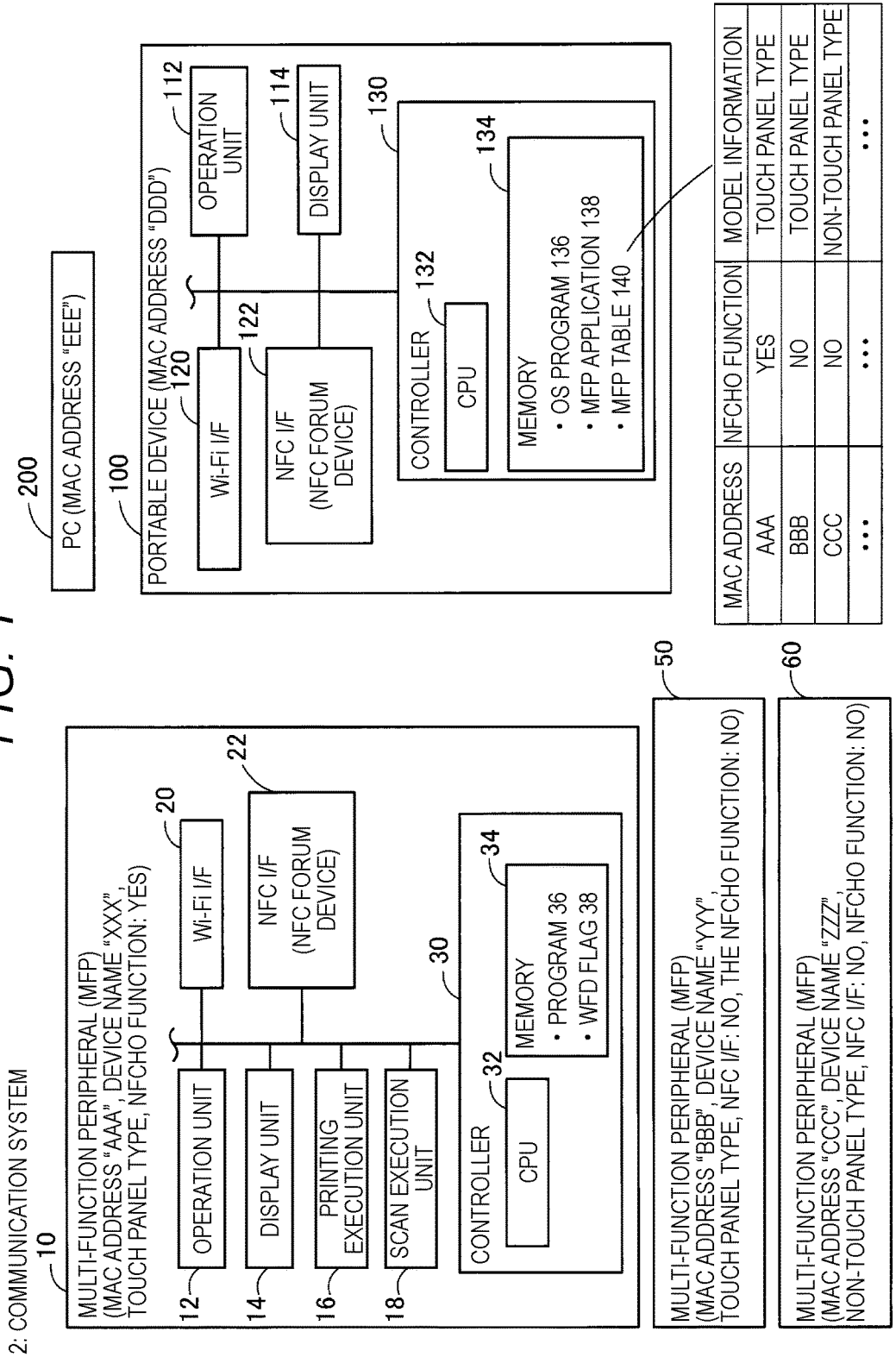
FIG. 1 depicts a configuration of a communication system.

DETAILED DESCRIPTION (Configuration of Communication System 2; FIG. 1)

As shown in FIG. 1, a communication system 2 includes a plurality of multi-function peripherals (hereinafter, referred to as "MFP (abbreviation of Multi-Function Peripheral)") 10, 50, 60, and a portable device 100. The MFP 10 and the portable device 100 can perform Wi-Fi communication therebetween, which is wireless communication in accordance with a Wi-Fi method, and also can perform NFC communication therebetween, which is wireless communication, in accordance with an NFC (abbreviation of Near Field Communication) method. The MFPs 50, 60 and the portable device 100 can perform Wi-Fi communication therebetween but cannot perform NFC communication therebetween.

(Configuration of MFP 10)

The MFP 10 is a peripheral apparatus (for example, a peripheral apparatus of a PC 200 and the like) that can execute multi-functions including a printing function and a scan function. The MFP 10 is allotted with a MAC address "AAA" and a device name "XXX". The MFP 10 includes an operation unit 12, a display unit 14, a printing execution unit 16, a scan execution unit 18, a Wi-Fi interface (hereinafter, referred to as "I/F") 20, an NFC I/F 22, and a controller 30.

The operation unit 12 has a plurality of keys. A user can input a variety of instructions to the MFP 10 by operating the operation unit 12. The display unit 14 is a display capable of displaying a variety of information by using character strings and icon images, and functions as a so-called touch panel (i.e., the operation unit) as well. In the below, the operation unit 12 and the display unit 14 may also be collectively referred to as "MFP operation unit". The printing execution unit 16 is a printing mechanism of an inkjet method, a laser method or the like. The scan execution unit 18 is a scan mechanism of a CCD, a CIS or the like.

The Wi-Fi I/F 20 is an I/F for performing Wi-Fi communication in accordance with the Wi-Fi method. The Wi-Fi method is a wireless communication method based on standards of IEEE (abbreviation of the Institute of Electrical and Electronics Engineers, Inc.) 802.11 and standards (for example, 802.11a, 11b, 11g, 11n and the like) equivalent thereto. The Wi-Fi I/F 20 supports a WFD (abbreviation of Wi-Fi Direct (registered trademark)) method set by Wi-Fi Alliance. The WFD method is a wireless communication method described in the standard document "Wi-Fi Peer-to-Peer (P2P) Technical Specification Version 1.5" prepared by Wi-Fi Alliance.

The MFP 10 can operate at any one state of a Group Owner state, a Client state and a device state of the WFD method. In the below, Group Owner and Client are referred to as "G/O" and "CL", respectively. When the MFP 10 operates at the G/O state, the MFP 10 forms a WFD network (hereinafter, referred to as the "WFDNW") in which the MFP 10 operates as a master station (i.e., G/O). The MFP 10 establishes Wi-Fi connection with an external device, and can enable the external device to participate in the WFDNW as a client station. For example, when the external device is a device that supports the WFD method (hereinafter, referred to as "WFD device"), the external device operates at the CL state and participates in the WFDNW as a client station (i.e., CL). Also, for example, when the external device is a device that does not support the WFD method, i.e., the external device is a legacy device, the external device participates in the WFDNW as a client station (i.e., legacy) without operating at any one state of the WFD method. The upper limit number of the client stations that can take part in the WFD network where the MFP 10 operates as the master station is preset. In the illustrative embodiment, the upper limit number is "1". On the other hand, in a modified embodiment, the upper limit number may be "2 or greater". Also, when the external device operates at the G/O state, the MFP 10 operates at the CL state. The MFP 10 establishes Wi-Fi connection with the external device, and can take part in the WFDNW formed by the external device, as the client station (i.e., CL). In the meantime, the device state is a state that is not any one of the G/O state nor the CL state, i.e., a state where the MFP 10 does not establish connection with the external device.

Also, the Wi-Fi I/F 20 supports a WPS (abbreviation of Wi-Fi Protected Setup) set by Wi-Fi Alliance. The WPS is referred to as a so-called automatic wireless setting or simple wireless setting, and is a technology by which Wi-Fi connection can be simply established between a pair of devices even though the user does not input wireless setting information (for example, a password, an authentication method, an encryption method and the like) for establishing wireless connection (hereinafter, referred to as "Wi-Fi connection") in accordance with the Wi-Fi method. In particular, the Wi-Fi I/F 20 supports a PBC (abbreviation of Push Button Configuration) of the WPS. The PBC method is a method for establishing Wi-Fi connection between a pair of devices when the user executes a wireless connection operation (for example, an operation of pushing a button) with each of the pair of devices.

The NFC I/F 22 is an I/F for performing NFC communication in accordance with an NFC (abbreviation of Near Field Communication) method. The NFC method is a wireless communication method based on international standards such as ISO/IEC 14443, 15693, 18092 and the like, for example. In the meantime, as types of the I/F for performing NFC communication, an I/F referred to as an NFC forum device, and an I/F referred to as an NFC forum tag are known. The NFC I/F 22 is an NFC forum device and can selectively operate in any one of a P2P (abbreviation of Peer To Peer) mode, an R/W (abbreviation of Reader/Writer) mode and a CE (abbreviation of Card Emulation).

Subsequently, differences between the Wi-Fi I/F 20 and the NFC I/F 22 are described. A communication speed (for example, a maximum communication speed is 11 to 600 Mbps) of Wi-Fi communication through the Wi-Fi I/F 20 is higher than a communication speed (for example, a maximum communication speed is 100 to 424 Kbps) of NFC communication through the NFC I/F 22. Also, a frequency (for example, 2.4 GHz band or 5.0 GHz band) of a carrier wave in Wi-Fi communication through the Wi-Fi I/F 20 is different from a frequency (for example, 13.56 MHz band) of a carrier wave in NFC communication through the NFC I/F 22. Also, a maximum distance (for example, up to about 100 m) in which Wi-Fi communication can be performed through the Wi-Fi I/F 20 is greater than a maximum distance (for example, up to about 10 cm) in which NFC communication can be performed through the NFC I/F 22.

The controller 30 includes a CPU 32 and a memory 34. The CPU 32 is configured to execute a variety of processing in accordance with a program 36 stored in the memory 34. The memory 34 is configured by a volatile memory, a non-volatile memory and the like. Also, the memory 34 has a WFD flag 38 stored therein. The WFD flag 38 indicates any one value of "ON", which means that the MFP 10 can operate in accordance with the WFD method, and "OFF", which means that the MFP 10 cannot operate in accordance with the WFD method. A state where the WFD flag 38 is "ON" is a state where an operating state of the MFP 10 is any one of the three states (i.e., the G/O state, the CL state and the device state) of the WFD method. A state where the WFD flag 38 is "OFF" is a state where the operating state of the MFP 10 is not any one of the three states of the WFD method.

Also, the MFP 10 has an NFC hand over function (hereinafter, referred to as "NFCHO (abbreviation of Hand Over) function"). The NFCHO function is a function of, when the NFC link is established between the MFP 10 and the external device, shifting an operating state of the MFP 10 from a disable state where it is not possible to newly establish Wi-Fi connection with the external device in accordance with the WFD method to an enable state where it is possible to newly establish Wi-Fi connection with the external device in accordance with the WFD method. Specifically, when the NFC link is established between the MFP 10 and the external device in a situation where the WFD flag 38 is "OFF", the MFP 10 changes the WFD flag 38 from "OFF" to "ON", so that the operating state of the MFP 10 is shifted from the disable state that is not any one of the three states of the WFD method to the enable state that is the device state. Also, when the NFC link is established between the MFP 10 and the external device in a situation where the MFP 10 operates at the G/O state and the Wi-Fi connection with the upper limit number of the client stations (i.e., one client station, in the illustrative embodiment) is established, the MFP 10 shifts the operating state of the MFP 10 from the disable state that is the G/O state to the enable state that is the device state. Also, when the NFC link is established between the MFP 10 and the external device in a situation where the MFP 10 operates at the CL state, the MFP 10 shifts the operating state of the MFP 10 from the disable state that is the CL state to the enable state that is the device state.

(Configurations of MFPs 50, 60)

The MFP 50 is allotted with a MAC address "BBB" and a device name "YYY", and the MFP 60 is allotted with a MAC address "CCC" and a device name "ZZZ". The MFP 50 has the same configuration as the MFP 10, except that it does not have the NFC I/F 22, i.e., it does not have the NFCHO function. The MFP 60 has the same configuration as the MFP 10, except that it does not have the NFC I/F 22, i.e., it does not have the NFCHO function and the configuration of the display unit is different. The display unit of the MFP 60 is a display having a size smaller than the display unit 14 of the MFP 10 and capable of displaying only a character string. The display unit does not function as a touch panel, and is a so-called non-touch panel type display.

(Configuration of Portable Device 100)

The portable device 100 is a portable device device such as a mobile phone, a smart phone, a PDA, a notebook, a tablet PC, a portable music reproduction device, a portable moving picture reproduction device, and the like, for example. The portable device 100 is allotted with a MAC address "DDD". The portable device 100 includes an operation unit 112, a display unit 114, a Wi-Fi I/F 120, an NFC I/F 122, and a controller 130.

The operation unit 112 has a plurality of keys. A user can input a variety of instructions to the portable device 100 by operating the operation unit 112. The display unit 114 is a display for displaying a variety of information, and functions as a so-called touch panel (i.e., the operation unit) as well. In the below, the operation unit 112 and the display unit 114 may also be collectively referred to as "device operation unit". The Wi-Fi I/F 120 and the NFC I/F 122 are the same as the Wi-Fi I/F 20 and the NFC I/F 22 of the MFP 10, respectively.

The controller 130 includes a CPU 132 and a memory 134. The CPU 132 is configured to execute a variety of processing in accordance with respective programs 136, 138 stored in the memory 134. The OS (abbreviation of Operation System) program 136 is a program for controlling diverse basic operations of the portable device 100. Also, the MFP application 138 is an application that is provided by a vendor of the MFP 10 or the like, and is installed in the portable device 100 from a server on the Internet, for example. The MFP application 138 is an application for establishing Wi-Fi connection between the portable device 100 and the MFP 10 or the like and performing communication of target data (for example, printing data, scan data and the like) by using the Wi-Fi connection between the portable device 100 and the MFP 10 or the like. In the below, the MFP application 138 is simply referred to as "application 138".

The memory 134 has an MFP table 140 stored therein. In the MFP table 140, for each of one or more MFPs 10 and the like having established Wi-Fi connection with the portable device 100, device information of the MFP is stored. The device information includes the MAC address of the MFP, NFCHO information, which indicates whether the MFP has the NFCHO function, and model information, which indicates whether the display unit of the MFP is a touch panel type or a non-touch panel type.

Figure 2:
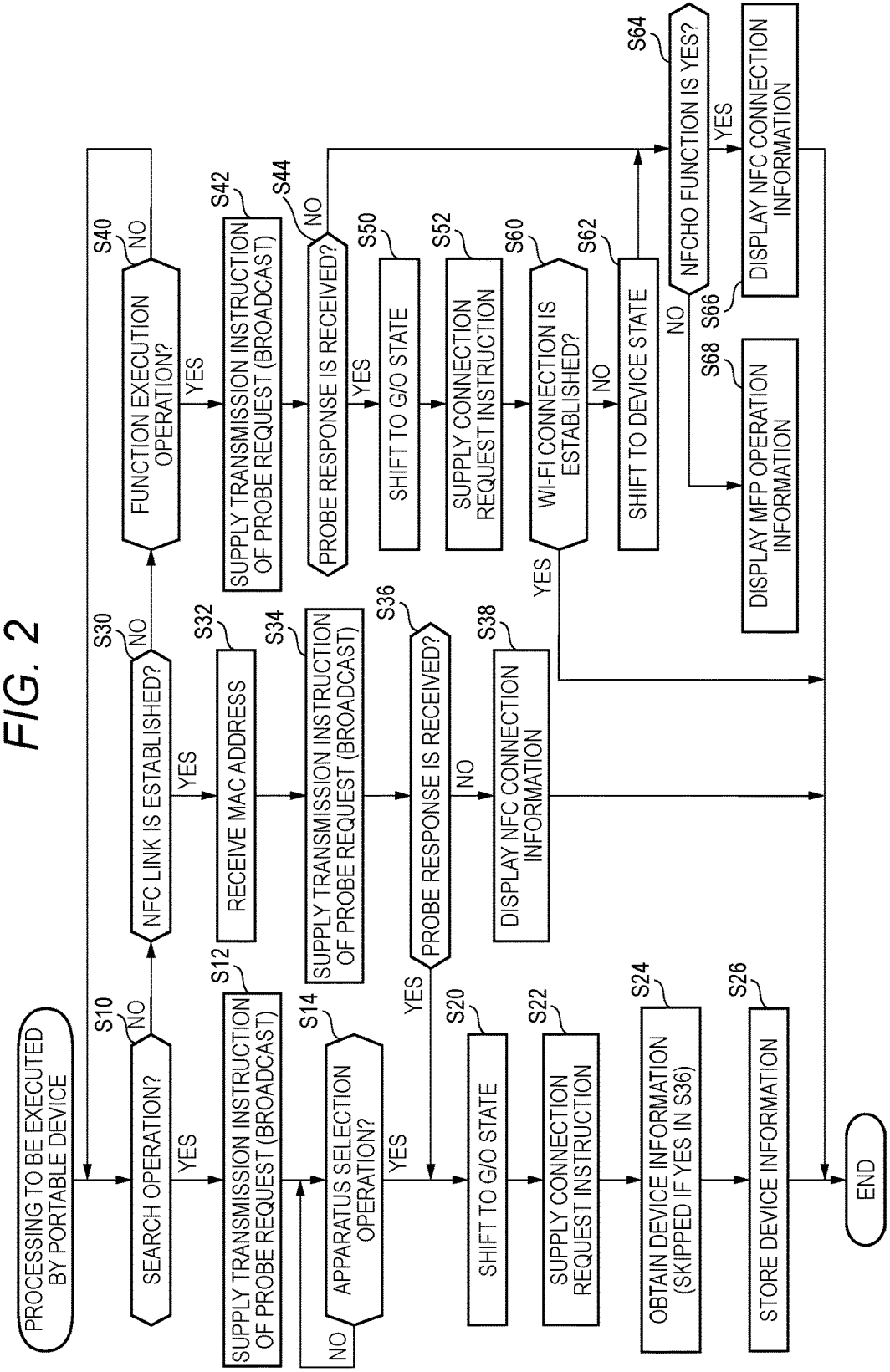
FIG. 2 depicts a flowchart of processing that is to be executed by a portable device.

(Processing to be Executed by Portable device 100; FIG. 2)

Subsequently, processing that is to be executed by the CPU 132 of the portable device 100 in accordance with the application 138 is described with reference to FIG. 2. When an operation for activating the application 138 is executed with the device operation unit, the CPU 132 executes processing of FIG. 2. In the below, for convenience of descriptions, the CPU 132 is not described as a subject, and a subject of processing that is to be executed by the CPU 132 in accordance with the application 138 and a subject of processing that is to be executed by the CPU 132 in accordance with the OS program 136 are respectively described as the "application 138", the "OS 136".

In S10, the application 138 monitors whether a search operation is executed with the device operation unit. The search operation is an operation for searching an apparatus (hereinafter, referred to as "target apparatus") capable of establishing Wi-Fi connection with the portable device 100. When the search operation is executed, the application 138 obtains search operation information, which indicates that the search operation has been executed, from the device operation unit (i.e., the operation unit 112 or the display unit 114), determines YES in S10, and proceeds to S12.

In S12, the application 138 supplies the OS 136 with an instruction for transmitting a Probe request by broadcast. In this case, the OS 136 supplies the instruction to the Wi-Fi I/F 120. In response to the transmission of the Probe request, the OS 136 receives a Probe response from each of one or more target apparatuses, via the Wi-Fi I/F 120. The Probe response includes a MAC address of the target apparatus, which is a transmission source. When the target apparatus, which is a transmission source, operates at the device state, the Probe response further includes a device name of the target apparatus, and when the target apparatus, which is a transmission source, operates at the G/O state, the Probe response further includes an SSID (abbreviation of Service Set Identifier) of the WFDNW in which the target apparatus operates as a G/O. Then, the OS 136 supplies each information (i.e., the MAC address, the device name, the SSID and the like) in one or more Probe replies to the application 138.

In S14, the application 138 displays the one or more device names and/or one or more SSIDs obtained from the OS 136 on the display unit 114, and monitors whether an apparatus selection operation for selecting one device name or SSID is executed with the device operation unit. The apparatus selection operation is an operation for selecting an apparatus with which the portable device 100 is to establish Wi-Fi connection. When the apparatus selection operation is executed, the application 138 determines YES in S14, and proceeds to S20. In the below, the device name or SSID that is selected in this step is referred to as "selection information", and the device identified by the selection information is referred to as "target device".

In S20, the application 138 shifts the operating state of the portable device 100 from the device state to the G/O state. As a result, the OS 136 forms a first WFDNW in which the portable device 100 operates as a master station (i.e., G/O), and generates first wireless setting information (for example, an SSID "YYY1", a password "PPP1" and the like) that is to be used in the first WFDNW. On the other hand, in a modified embodiment, the application 138 may shift the operating state of the portable device 100 from a state where a SoftAP is not activated to a state where the SoftAP is activated. Also in this case, a wireless network in which the portable device 100 operates as a master station is formed.

In S22, the application 138 supplies a connection request instruction to the OS 136. The connection request instruction includes an instruction for transmitting a Probe request, which includes the MAC address received together with the selection information selected in S14, and an instruction for transmitting an Invitation request. When the connection request instruction is obtained, the OS 136 supplies the Wi-Fi I/F 120 with the instruction for transmitting the Probe request, which includes the MAC address, i.e., an instruction for transmitting the Probe request to the target device. In response to the transmission of the Probe request to the target device, the OS 136 receives a Probe response from the target device via the Wi-Fi I/F 120. Then, the OS 136 supplies the Wi-Fi I/F 120 with an instruction for transmitting an Invitation request to the target device. The Invitation request is a command for requesting participation in the first WFDNW where the portable device 100 operates as a master station. Then, in response to the transmission of the Invitation request to the target device, the OS 136 receives an Invitation reply from the target device via the Wi-Fi I/F 120.

Thereafter, the OS 136 executes processing for establishing Wi-Fi connection with the target device. Specifically, the OS 136 first determines whether Persistent information including the MAC address of the target device is stored in the memory 134. The Persistent information is wireless setting information used so as to establish Wi-Fi connection between the target device and the portable device 100, i.e., first wireless setting information used in the first WFDNW formed in the past by the portable device 100.

When it is determined that the Persistent information including the MAC address of the target device is not stored, the OS 136 executes WPS connection processing. The WPS connection processing includes processing of transmitting the first wireless setting information to the target device and establishing Wi-Fi connection with the target device by using the wireless setting information. Then, the OS 136 stores the Persistent information, which includes the MAC address of the target device and the first wireless setting information generated in S20, in the memory 134.

On the other hand, when it is determined that the Persistent information including the MAC address of the target device is stored, the OS 136 executes Persistent connection processing. The Persistent connection processing includes processing of establishing Wi-Fi connection with the target device by using the Persistent information.

In S24, the application 138 transmits a device information request to the MFP 10 by using the Wi-Fi connection (i.e., via the Wi-Fi I/F 20) established in S22, and obtains the device information (i.e., the MAC address, the NFCHO information, and the model information) of the target device from the MFP 10 via the Wi-Fi I/F 20.

In S26, the application 138 registers the device information obtained in S24 in the MFP table 140 of the memory 134. When the processing of S26 is over, the processing of FIG. 2 is over.

Thereafter, although not shown, the application 138 performs communication of target data (for example, printing data or scan data) with the target device by using the Wi-Fi connection.

Also, the application 138 monitors whether the NFC link is established, in S30, simultaneously with the monitoring in S10. When NFC establishment information, which indicates that the NFC link is established, is obtained from the NFC I/F 122, the application 138 determines YES in S30, and proceeds to S32. In the below, a device for which the NFC link is established is referred to as "target device".

In S32, the application 138 receives the MAC address of the target device from the target device via the NFC I/F 122. The processing of S34 is the same as the processing of S12.

In S36, the application 138 determines whether a Probe response is received from the target device. When the MAC address of the target device received in S32 is included in the one or more MAC addresses in the one or more Probe replies received in S34, the application 138 determines YES in S36, and proceeds to S20. Then, the processing of S20 and S22 is executed, and Wi-Fi connection with the target device is established. In this case, the application 138 skips over S24, and executes the processing of S26. When the determination result of S30 is YES and the Wi-Fi connection with the MFP 10 is then established, the application 138 determines that the target device has the NFCHO function, and registers the device information including the NFCHO information "YES" in the MFP table 140 without transmitting the device information request to the target device, in S26. In this case, the device information does not include the model information.

On the other hand, when even one Probe response is not received in S34 or when the MAC address "AAA" of the target device is not included in the one or more MAC addresses in the one or more Probe replies received in S34, the application 138 determines NO in S36, and proceeds to S38. In S38, the application 138 displays NFC connection information on the display unit 114. The NFC connection information includes a message for urging the user to establish the NFC link between the portable device 100 and the target device, more specifically, a message for urging the user to again bring the portable device 100 close to the target device. For example, in a situation where a radio wave situation about Wi-Fi communication between the portable device 100 and the target device is unstable, the determination result of S36 may be NO. In this situation, since the NFC connection information of S38 is displayed, the user again brings the portable device 100 close to the target device, so that the application 138 again determines YES in S30. As a result, in S34, the Probe request is re-transmitted. At this time, when the radio wave situation has been improved, the Probe response to the Probe request is received (YES in S36), so that Wi-Fi connection between the portable device 100 and the target device is established. When the processing of S38 is over, the processing of FIG. 2 is over.

Also, the application 138 monitors whether the function execution operation is executed with the device operation unit, in S40, simultaneously with the monitoring in S10 and S30. The function execution operation is allowed to be executed on condition that the Wi-Fi connection with the target device has been established in the part. That is, the application 138 receives an input of the function execution operation on condition that the Persistent information, which includes the MAC address of the target device for which the Wi-Fi connection has been established in the part, is stored in the memory 134. In the meantime, when a plurality of Persistent information corresponding to a plurality of target devices is stored in the memory 134, the application 138 receives an input of the function execution operation including selecting one target device from the plurality of target devices. When the function execution operation is executed (YES in S40), the application 138 displays a function execution screen on the display unit 114. The function execution screen is a screen for selecting a function (for example, a printing function, a scan function or the like) that is to be executed by the target device. When a function is selected on the function execution screen, the application 138 obtains function selection information, which indicates that the function has been selected, from the device operation unit (i.e., the operation unit 112 or the display unit 114), determines YES in S40, and proceeds to S42.

The processing of S42 and S44 is the same as the processing of S34 and S36, respectively. In the meantime, when the MAC address of the target device in the Persistent information is included in the one or more MAC addresses in one or more Probe replies received in S42, the application 138 determines YES in S44, and proceeds to S50. On the other hand, when the MAC address of the target device is not included in the one or more MAC addresses in one or more Probe replies received in S42, the application 138 determines NO in S44, and proceeds to S64. The processing of S50 and S52 is the same as the processing of S20 and S22, respectively.

In S60, the application 138 determines whether Wi-Fi establishment information is to be obtained from the OS 136. The Wi-Fi establishment information is information that is to be supplied from the OS 136 to the application 138 when the Wi-Fi connection with the target device is established in S52. When the Wi-Fi establishment information is obtained from the OS 136, the application 138 determines YES in S60, and transmits an execution request of the function selected on the function execution screen to the target device by using the Wi-Fi connection, which is not shown. Thereby, the processing of FIG. 2 is over.

On the other hand, when the Wi-Fi establishment information is not received, the application 138 determines NO in S60, and proceeds to S62. In the meantime, the case where the Wi-Fi establishment information is not received indicates a case where even when the OS 136 supplies the Wi-Fi I/F 120 with an instruction of transmitting an Invitation request, an Invitation reply is not received from the target device via the Wi-Fi I/F 120, for example. In S62, the application 138 shifts the operating state of the portable device 100 from the G/O state to the device state.

In S64, the application 138 determines whether the target device has the NFCHO function by using the MFP table 140. When the NFCHO information corresponding to the MAC address of the target device indicates "YES", the application 138 determines YES in S64, and proceeds to S66. The processing of S66 is the same as the processing of S38. When the processing of S66 is over, the processing of FIG. 2 is over.

On the other hand, when the NFCHO information corresponding to the MAC address of the target device indicates "NO", the application 138 determines NO in S64, and proceeds to S68. In S68, the application 138 displays MFP operation information on the display unit 114. The MFP operation information includes a message for urging the user to execute an operation for shifting the target device from the disable state to the enable state with the MFP operation unit. The MFP operation information is different depending on each model information. Therefore, the application 138 displays the MFP operation information suitable for the model information of the target device on the display unit 114. When the processing of S68 is over, the processing of FIG. 2 is over.

(Specific Cases)

In the below, specific cases A to G that are to be implemented by the processing of FIG. 2 are described with reference to FIGS. 3 to 8. In each drawing, a solid arrow indicates NFC communication, and a thin arrow indicates Wi-Fi communication.

Figure 3:
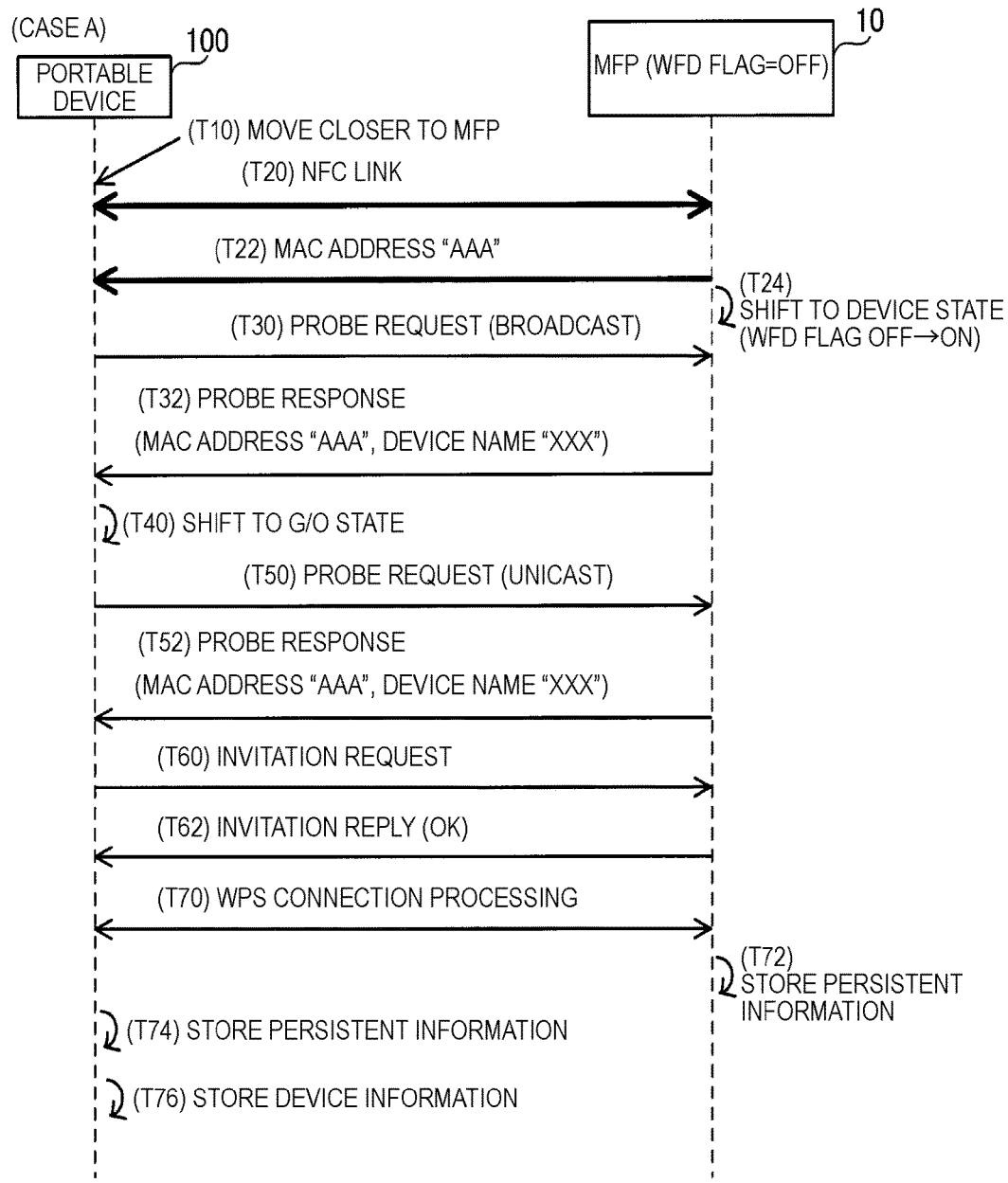
FIG. 3 depicts a sequence diagram of a case A where an NFC link is established between the portable device and an MFP.

(Case A; FIG. 3)

At an initial state of a case A, the WFD flag 38 of the MFP 10 is set to "OFF", and the MFP 10 is at the disable state that is not any one of the three states of the WFD method. Also, the Wi-Fi connection or the NFC link has not been established between the MFP 10 and the portable device 100. For this reason, the device information of the MFP 10 is not stored in the MFP table 140 of the portable device 100, and the Persistent information is not stored in any one of the MFP 10 and the portable device 100.

In T10, when the user brings the portable device 100 close to the MFP 10, the NFC link is established between the MFP 10 and the portable device 100 in T20 (YES in S30 of FIG. 2).

In T22, the MFP 10 transmits the MAC address "AAA" to the portable device 100 by using the NFC link (S32). When the NFC link is established, the MFP 10 changes the WFD flag 38 from "OFF" to "ON" in T24, thereby automatically shifting the operating state of the MFP 10 from the disable state, which is not any one of the three states of the WFD method, to the enable state that is the device state.

In T22, when the MAC address "AAA" is received from the MFP 10 by using the NFC link (S32), the portable device 100 transmits a Probe request by broadcast in T30 (S34).

In T30, when the Probe request is received from the portable device 100, the MFP 10 transmits a Probe response including the MAC address "AAA" and the device name "XXX" to the portable device 100 in T32.

In T32, when the Probe response is received from the MFP 10, the portable device 100 determines that the Probe response including the MAC address "AAA" has been received (YES in S36), and shifts to the G/O state in T40 (S20). Thereby, the portable device 100 forms the first WFDNW, and generates first wireless setting information (for example, an SSID "YYY1", a password "PPP1" and the like) that is to be used in the first WFDNW. Then, in T50, the portable device 100 transmits the Probe request including the MAC address "AAA" received in T22 to the MFP 10 (S22).

In T50, when the Probe request is received from the portable device 100, the MFP 10 transmits the Probe response including the MAC address "AAA" and the device name "XXX" to the portable device 100 in T52.

In T52, when the Probe response is received from the MFP 10, the portable device 100 determines that the Persistent information including the MAC address "AAA" of the MFP 10 has not been stored, and transmits an Invitation request for requesting execution of the WPS connection processing to the MFP 10 in T60 (S22).

In T60, when the Invitation request is received from the portable device 100, the MFP 10 transmits an Invitation reply including OK information to the portable device 100 in T62.

In T70, WPS connection processing is executed between the MFP 10 and the portable device 100 (S22). Specifically, the MFP 10 receives the first wireless setting information including the SSID "YYY1" of the first WFDNW and the password "PPP1" of the first WFDNW from the portable device 100. Then, communication such as—way Handshake is performed between the MFP 10 and the portable device 100, so that Wi-Fi connection is established (S22).

In T72, the MFP 10 stores the Persistent information, which includes the MAC address "BBB" of the portable device 100 and the first wireless setting information received in T70, in the memory 34.

Also, the portable device 100 stores the Persistent information, which includes the MAC address "AAA" of the MFP 10 and the first wireless setting information generated in T40, in the memory 134, in T74. In T76, the portable device 100 stores the device information of the MFP 10 in the memory 134. Specifically, since the NFC link with the MFP 10 has been established (T20), the portable device 100 determines that the MFP 10 has the NFCHO function, and registers the MAC address "AAA" and the NFCHO information "YES" in the MFP table 140.

Figure 4:
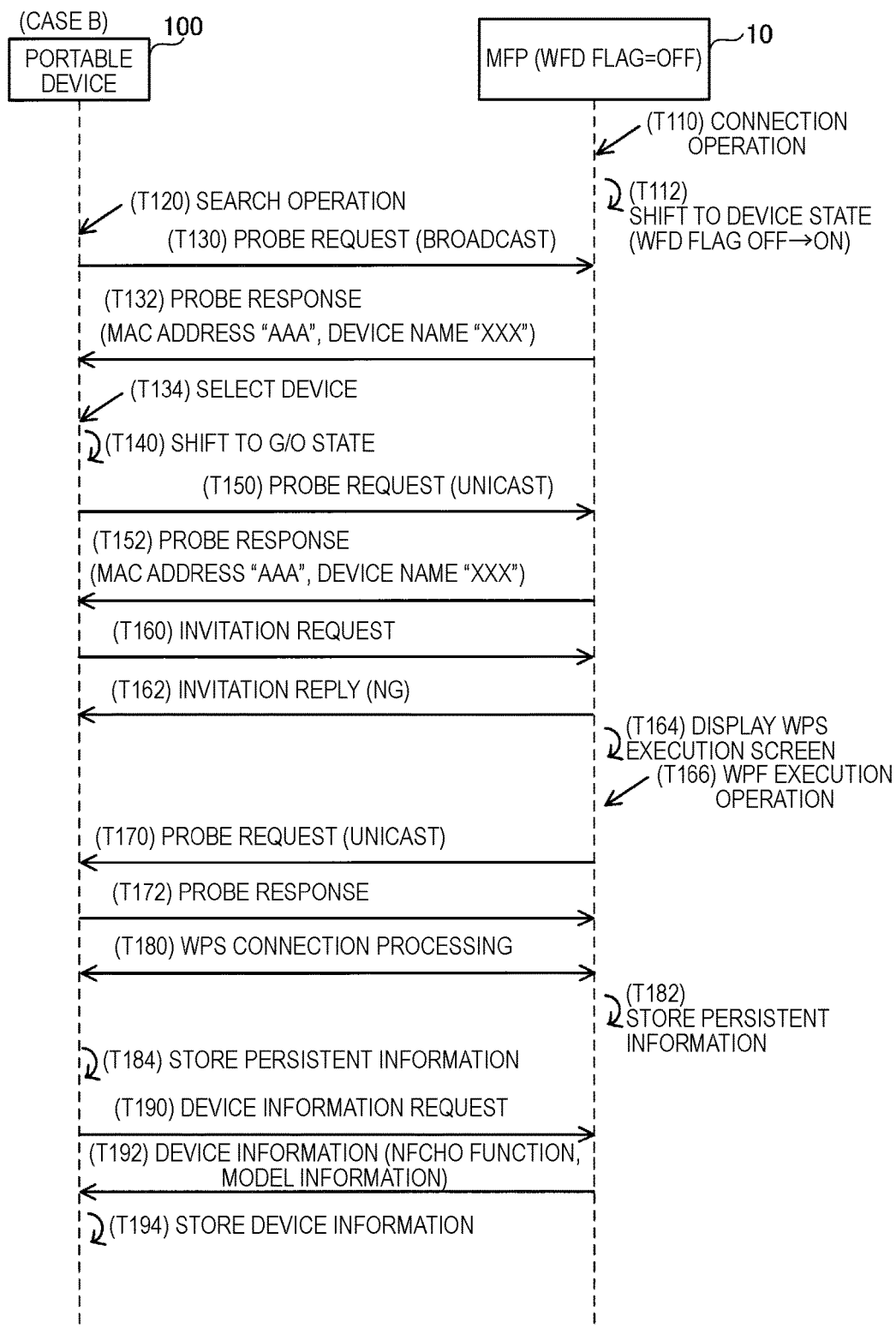
FIG. 4 depicts a sequence diagram of a case B where a search operation is executed with the portable device.

(Case B; FIG. 4)

An initial state of a case B is the same as that of the case A. In the case B, instead of the configuration where when the NFC link is established, which is a trigger, the Wi-Fi connection is established between the MFP 10 and the portable device 100, when the search operation (YES in S10 of FIG. 2) is executed with the portable device 100, which is a trigger, the Wi-Fi connection is established between the MFP 10 and the portable device 100.

In T110, when the user executes a connection operation with the MFP 10, processing of T112 is executed, like T24 of FIG. 3. The connection operation is a predetermined operation for changing the WFD flag 38 from "OFF" to "ON".

In T120, when the user executes the search operation with the portable device 100 (YES in S10), processing of T130 and T132 is executed, like T30 and T32 of FIG. 3 (S12). Then, the portable device 100 displays the device name "XXX" of the MFP 10, and receives a selection of the device name "XXX" in T134 (YES in S14). The processing of T140 to T160 is the same as the processing of T40 to T60 (S20, S22).

As described above, in the case A of FIG. 3 where the NFC link is established, the MFP 10 transmits the Invitation reply indicative of the OK information and then automatically executes the processing (T62, T70) for establishing the Wi-Fi connection with the portable device 100 without receiving a user's operation. In contrast, in the case B where the NFC link is not established, the MFP 10 transmits an Invitation reply indicative of NG information in T162, and displays a WPS execution screen on the display unit 14 in T164. The WPS execution screen is a screen for inquiring of the user whether or not to execute the WPS connection processing. In T166, when a WPS execution operation, which indicates that the WPS connection processing is to be executed, is executed by the user, the MFP 10 transmits a Probe request including the MAC address "BBB" of the portable device 100 to the portable device 100, in T170. In the meantime, the MAC address "BBB" is included in the Invitation request received in T160.

In T170, when the Probe request is received from the MFP 10, the portable device 100 transmits the Probe response to the MFP 10 in T172. The processing of T180 to T184 is the same as that of T70 to T74 of FIG. 3.

In T190, the portable device 100 transmits a device information request for obtaining the device information of the MFP 10 to the MFP 10 by using the Wi-Fi connection, and receives the device information (i.e., the MAC address "AAA", the NFCHO information "YES" and the model information "touch panel type") of the MFP 10 from the MFP 10 by using the Wi-Fi connection in T192 (S24). In T194, the MFP 10 registers the device information received in T192 in the MFP table 140 (S26).

Figure 5:
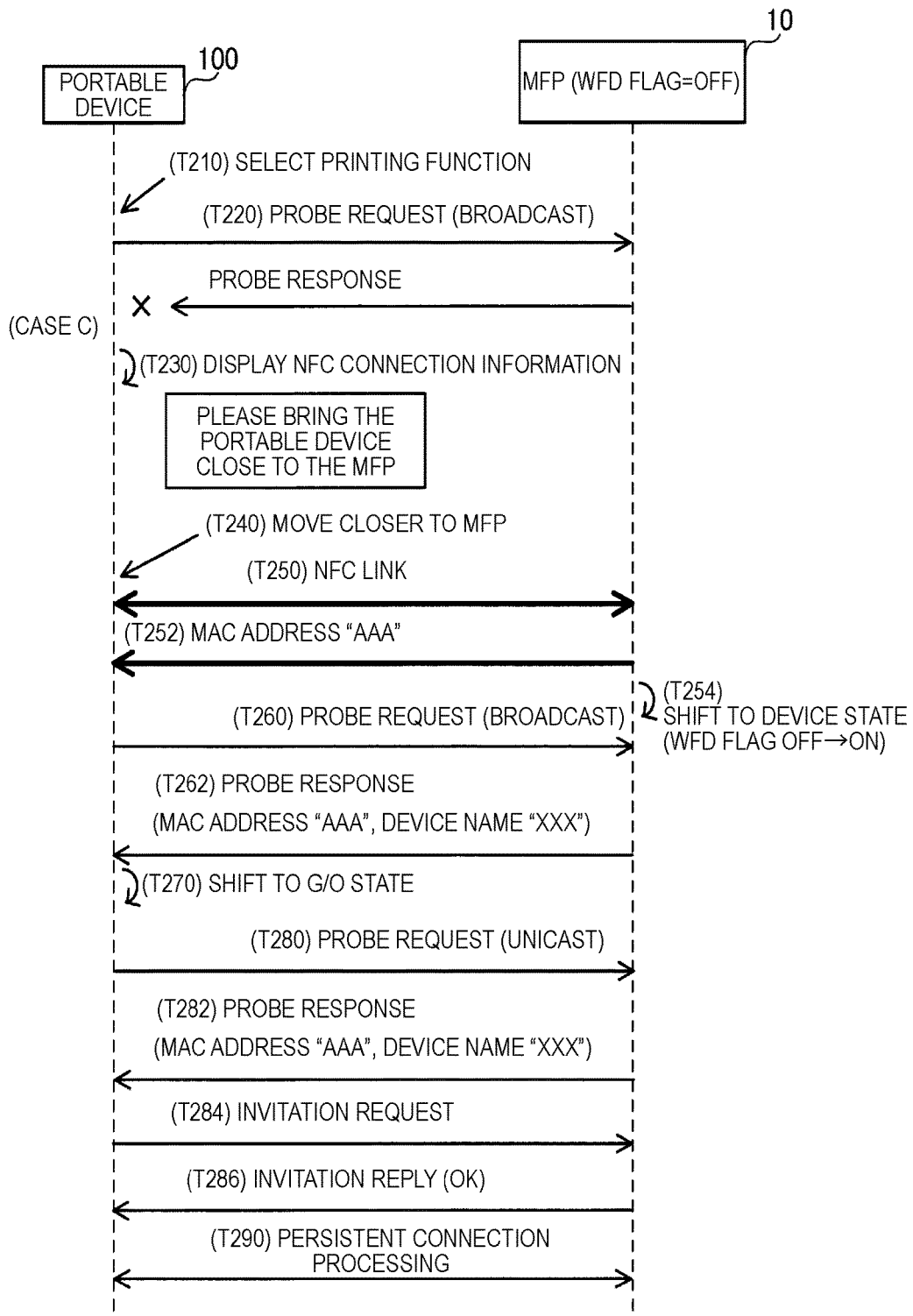
FIG. 5 depicts a sequence diagram of a case C where Wi-Fi connection is re-established between the MFP and the portable device at a state where the portable device cannot execute an operation in accordance with a WFD method.

(Case C; FIG. 5)

An initial state of the case C is a state after FIG. 3 or 4, i.e., a state where the device information (i.e., the NFCHO information "YES") of the MFP 10 has been registered in the MFP table 140, and is also a state where the Persistent information has been stored in each of the MFP 10 and the portable device 100. Also, the initial state is a state after the Wi-Fi connection between the MFP 10 and the portable device 100 in FIG. 3 or 4 is disconnected and the WFD flag 38 of the MFP 10 is then changed from "ON" to "OFF" by the user.

In T210, the portable device 100 receives a function execution operation for enabling the MFP 10 to execute a printing function (YES in S40). In this case, the portable device 100 transmits a Probe request by the broadcast in T220 (S42).

Since the MFP 10 is at the disable state (i.e., it is not possible to newly establish the Wi-Fi connection with the external device in accordance with the WFD method) where the WFD flag 38 is "OFF", even when the MFP 10 receives the Probe request from the portable device 100, the MFP does not transmit a Probe response to the Probe request.

The portable device 100 determines that even one Probe response is not received in response to the Probe request of T220 (NO in S44), determines that the MFP 10 has the NFCHO function (YES in S64), and displays the NFC connection information in T230 (S66). The NFC connection information includes a message for urging the user to bring the portable device close to the MFP 10. Thereby, the user can know that the user has only to bring the portable device 100 close to the MFP 10. As a result, in T240, when the user brings the portable device 100 to the MFP 10, the NFC link is established between the MFP 10 and the portable device 100 in T250 (YES in S30). The processing of T252 to T282 is the same as that of T22 to T52 of FIG. 3. That is, the MFP 10 shifts to the device state in T254 as the NFC link with the portable device 100 is established.

In T282, when the portable device 100 receives a Probe response from the MFP 10, the portable device determines that the Persistent information including the MAC address "AAA" of the MFP 10 is stored, and transmits an Invitation request for requesting execution of the Persistent connection processing to the MFP 10 in T284.

In T284, when the MFP 10 receives the Invitation request from the portable device 100, the MFP transmits an Invitation reply including OK information to the portable device 100 in T286.

In T290, the Persistent connection processing is executed between the MFP 10 and the portable device 100. Specifically, the Wi-Fi connection is established between the MFP 10 and the portable device 100 by using the Persistent information. Then, the portable device 100 transmits an execution request of the printing function selected in T210 to the MFP 10 by using the Wi-Fi connection.

Figure 6:
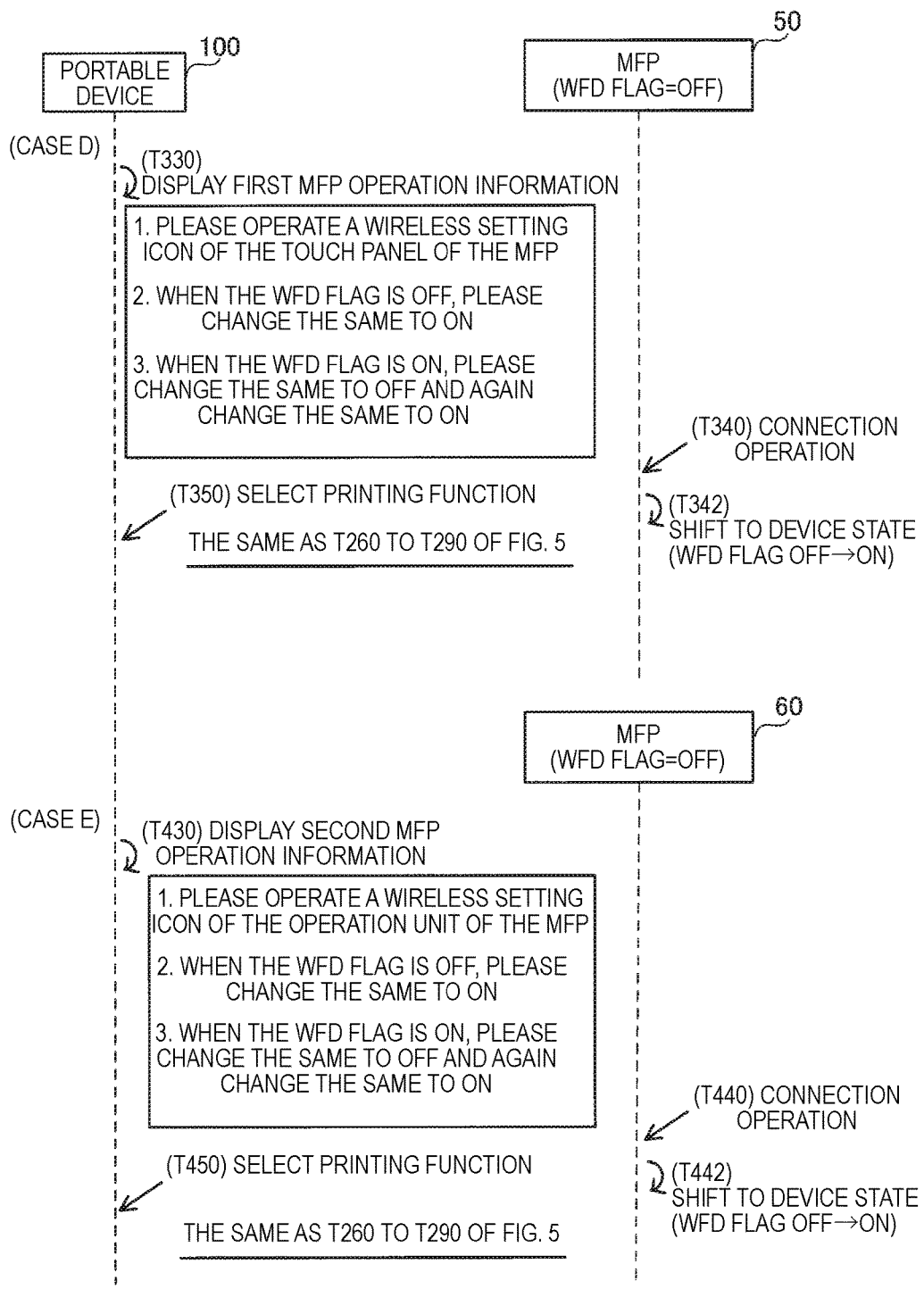
FIG. 6 depicts a sequence diagram of cases D and E where the Wi-Fi connection is re-established between the MFP and the portable device at a state where the portable device cannot execute an operation in accordance with the WFD method.

(Case D; FIG. 6)

An initial state of the case D is a state after the same processing as FIG. 4 is executed between the MFP 50 different from the MFP 10 and the portable device 100, i.e., a state where the device information (i.e., the NFCHO information "NO", the model information "touch panel type") of the MFP 50 has been registered in the MFP table 140, and is also a state where the Persistent information has been stored in each of the MFP 50 and the portable device 100. Also, the initial state is a state after the Wi-Fi connection between the MFP 50 and the portable device 100 is disconnected in the same processing as FIG. 4 and the WFD flag of the MFP 50 is then changed to "OFF".

In T210 of FIG. 5, the portable device 100 receives the function execution operation for enabling the MFP 50 to execute the printing function (YES in S40), and transmits a Probe request by the broadcast in T220 (S42). However, like the case of FIG. 5, the portable device 100 determines that even one Probe response to the Probe request of T220 is not received (NO in S44). The portable device 100 determines that the MFP 50 does not have the NFCHO function (NO in S64), and displays first MFP operation information suitable for the model information "touch panel type" of the MFP 50 in T330 (S68). The first MFP operation information includes messages such as "1. Please operate a wireless setting icon of the MFP", "2. When the WFD flag is OFF, please change the same to ON", and the like.

In T340, the user executes a connection operation in accordance with the messages of "1." and "2.", i.e., a connection operation for changing the WFD flag from "OFF" to "ON" with the MFP 50, the MFP 50 changes the WFD flag from "OFF" to "ON" in T342 and shifts from the disable state that is not any one of the three states of the WFD method to the enable state that is the device state.

Then, in T350, when the user executes a function execution operation for enabling the MFP 50 to select the printing function with the portable device 100, the same processing as T260 to T290 of FIG. 5 is executed, and the Wi-Fi connection is established between the MFP 50 and the portable device 100. Then, the portable device 100 transmits an execution request of the printing function to the MFP 50 by using the Wi-Fi connection.

(Advantages of Cases C and D)

According to the illustrative embodiment, when the establishment of the Wi-Fi connection with the target device fails, the portable device 100 can display information suitable for the device information of the target device. Specifically, as shown in the case C of FIG. 5, when the NFCHO information of the MFP 10, which is the target device, is "YES", the portable device 100 displays the NFC connection information (T230). Thereby, since the user brings the portable device 100 close to the MFP 10, the portable device 100 can appropriately re-establish the Wi-Fi connection with the MFP 10. On the other hand, as shown in the case D of FIG. 6, when the NFCHO information of the MFP 50, which is the target device, is "NO", the portable device 100 displays the first MFP operation information (T330). Thereby, since the user executes the connection operation with the MFP 50, the portable device 100 can appropriately re-establish the Wi-Fi connection with the MFP 50.

Also, although not shown, for example, in a situation where the MFP 50 operates as the client station (i.e., the CL state) of the WFDNW, the portable device 100 cannot receive the Probe response from the MFP 50 even when it transmits the Probe request. Also in this case, the portable device 100 determines that the establishment of the Wi-Fi connection with the target device fails (NO in S44), determines that the MFP 50 does not have the NFCHO function (NO in S64), and displays the first MFP operation information, which is the same as T330. When the user executes an operation in accordance with the message of "1." in the first MFP operation information with the MFP 50, the user can know that the WFD flag of the MFP 50 is "ON". In this case, the user first changes the WFD flag of the MFP 50 from "ON" to "OFF" in accordance with the message of "3." in the first MFP operation information. Thereby, the MFP 50 shifts from the CL state to a state that is not any one of the three states of the WFD method. Then, the user additionally changes the WFD flag of the MFP 50 from "OFF" to "ON". Thereby, the MFP 50 shifts from the state that is not any one of the three states of the WFD method to the device state. As a result, the processing of T350 and thereafter in the case D is executed, so that the portable device 100 can appropriately re-establish the Wi-Fi connection with the MFP 50.

Also, although not shown, for example, in a situation where the MFP 50 operates as the master station (i.e., the G/O state) of the WFDNW, the portable device 100 receives the Probe response from the MFP 50 when it transmits the Probe request. However, even when the portable device 100 transmits the Invitation request to the MFP 50, it cannot receive the Invitation reply from the MFP 50. Also in this case, the portable device 100 determines that the establishment of the Wi-Fi connection with the target device fails (NO in S60), determines that the MFP 50 does not have the NFCHO function (NO in S64), and displays the first MFP operation information, which is the same as T330. The user executes operations in accordance with the messages of "1." and "3." in the first MFP operation information with the MFP 50. Thereby, the MFP 50 shifts from the G/O state to the device state via a state that is not any one of the three states of the WFD method. As a result, the processing of T350 and thereafter in the case D is executed, so that the portable device 100 can appropriately re-establish the Wi-Fi connection with the MFP 50.

(Case E; FIG. 6)

An initial state of a case E is a state after the same processing as FIG. 4 has been executed between the MFP 60 different from the MFP 10 and the portable device 100, i.e., a state where the device information (i.e., the NFCHO information "NO", the model information "non-touch panel type") of the MFP 60 has been registered in the MFP table 140, and is also a state where the Persistent information has been stored in each of the MFP 60 and the portable device 100. Also, the initial state is a state after the Wi-Fi connection between the MFP 60 and the portable device 100 is disconnected and then the WFD flag of the MFP 60 is changed to "OFF" in the same processing as FIG. 4.

In T210 of FIG. 5, the portable device 100 receives a function execution operation for enabling the MFP 60 to execute the printing function (YES in S40), and transmits a Probe request by the broadcast in T220 (S42). However, like the case of FIG. 5, the portable device 100 determines that even one Probe response is not received in response to the Probe request of T220 (NO in S44). Then, the portable device 100 determines that the MFP 60 does not have the NFCHO function (NO in S64), and displays second MFP operation information suitable for the model information "non-touch panel type" of the MFP 60 in T430 (S68). The second MFP operation information includes a message such as "1. Please operate a wireless setting button of the operation unit of the MFP". The second MFP operation information includes a message for urging the user to operate the operation unit (i.e., hard buttons) of the non-touch panel type, which is different from the first MFP operation information of the case D.

In T440, when the user executes operations in accordance with the messages of "1." and "2.", i.e., the connection operation for changing the WFD flag from "OFF" to "ON" with the MFP 60, the MFP 60 changes the WFD flag from "OFF" to "ON" in T442, and shifts from the disable state that is not any one of the three states of the WFD method to the enable state that is the device state. The processing of T450 and thereafter is the same as the processing of T350 and thereafter of the case C.

(Advantages of Cases D and E)

As shown in the case D, when the model information of the MFP 50, which is the target device, is "touch panel type", the portable device 100 displays the first MFP operation information for urging the user to operate the touch panel (i.e., soft buttons) of the MFP 50 (T330). Thereby, since the user operates the touch panel of the MFP 50, the portable device 100 can appropriately re-establish the Wi-Fi connection with the MFP 50. In the meantime, as shown in the case E, when the model information of the MFP 60, which is the target device, is "non-touch panel type", the portable device 100 displays the second MFP operation information for urging the user to operate the hard buttons of the MFP 50 (T430). Thereby, since the user operates the hard buttons of the MFP 60, the portable device 100 can appropriately re-establish the Wi-Fi connection with the MFP 60.

Figure 7:
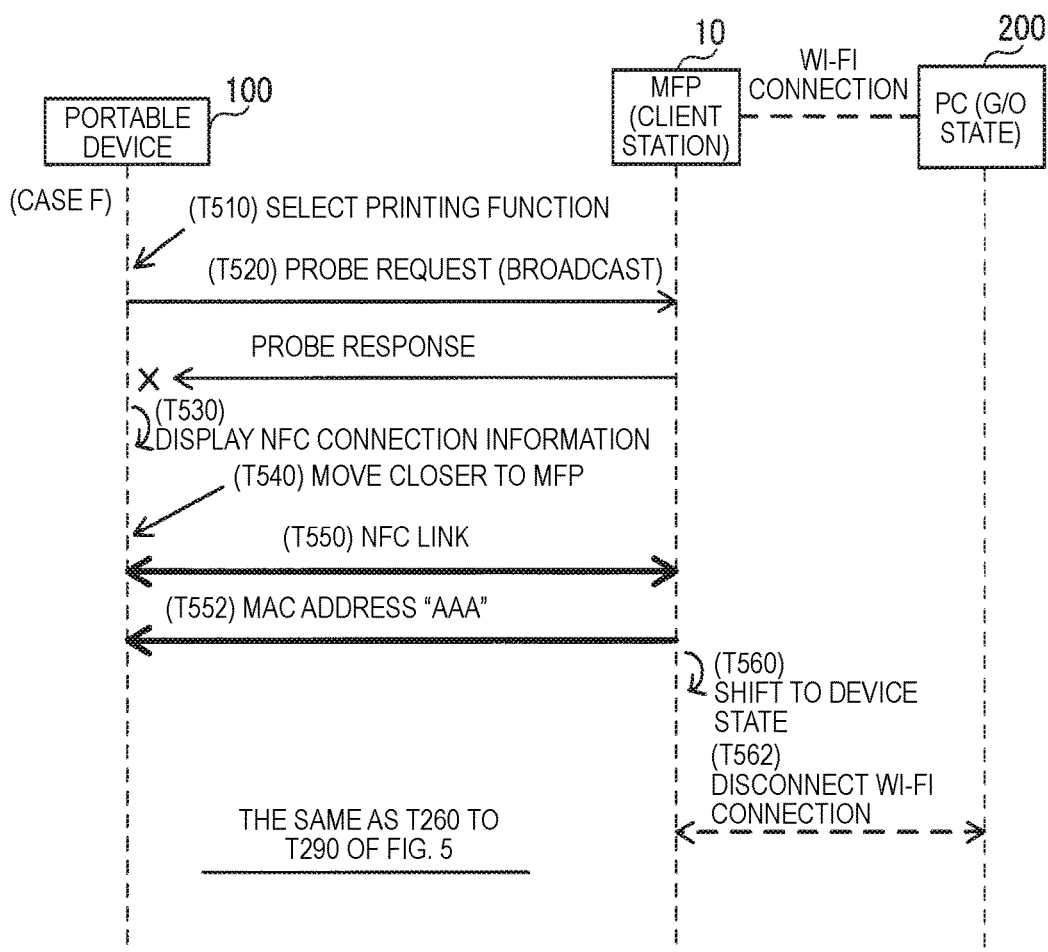
FIG. 7 depicts a sequence diagram of a case F where the Wi-Fi connection is re-established between the MFP and the portable device at a state where the MFP operates as a client station.

(Case F; FIG. 7)

An initial state of the case F is a state after FIG. 3, i.e., a state where the device information (i.e., the NFCHO information "YES") of the MFP 10 has been registered in the MFP table 140, and is also a state where the Persistent information has been stored in each of the MFP 10 and the portable device 100. Also, the initial state is a state after the Wi-Fi connection between the MFP 10 and the portable device 100 is disconnected and then the MFP 10 takes part in the second the WFDNW, in which the PC 200 operates as the master station, as the client station.

The processing of T510 and T520 is the same as that of T210 and T220 of FIG. 5. When the MFP 10 is at the CL state, the MFP does not transmit the Probe response to the portable device 100 even though it receives the Probe request from the portable device 100.

The portable device 100 determines that even one Probe response is not received in response to the Probe request of T520 (NO in S44), determines that the MFP 10 has the NFCHO function (YES in S64), and displays the NFC connection information in T530 (S66). The processing of T540 to T552 is the same as that of T240 to T252 of FIG. 5.

In T560, the MFP 10 shifts from the CL state to the device state, and the Wi-Fi connection between the MFP 10 and the PC 200 is disconnected in T562. Then, the same processing as T260 to T290 of FIG. 5 is executed, so that the Wi-Fi connection between the MFP 10 and the portable device 100 is established.

(Advantages of Case F)

At the state where the MFP 10 takes part in the second the WFDNW, as the client station, the portable device 100 cannot establish the Wi-Fi connection with the MFP 10. According to this illustrative embodiment, when it is determined that the establishment of the Wi-Fi connection with the MFP 10 fails (NO in S44), the portable device 100 determines that the MFP 10 has the NFCHO function (YES in S64), and displays the NFC connection information (T530). Thereby, since the user brings the portable device 100 close to the MFP 10, the MFP 10 shifts to the device state (T560), so that the portable device 100 can appropriately re-establish the Wi-Fi connection with the MFP 10.

Figure 8:
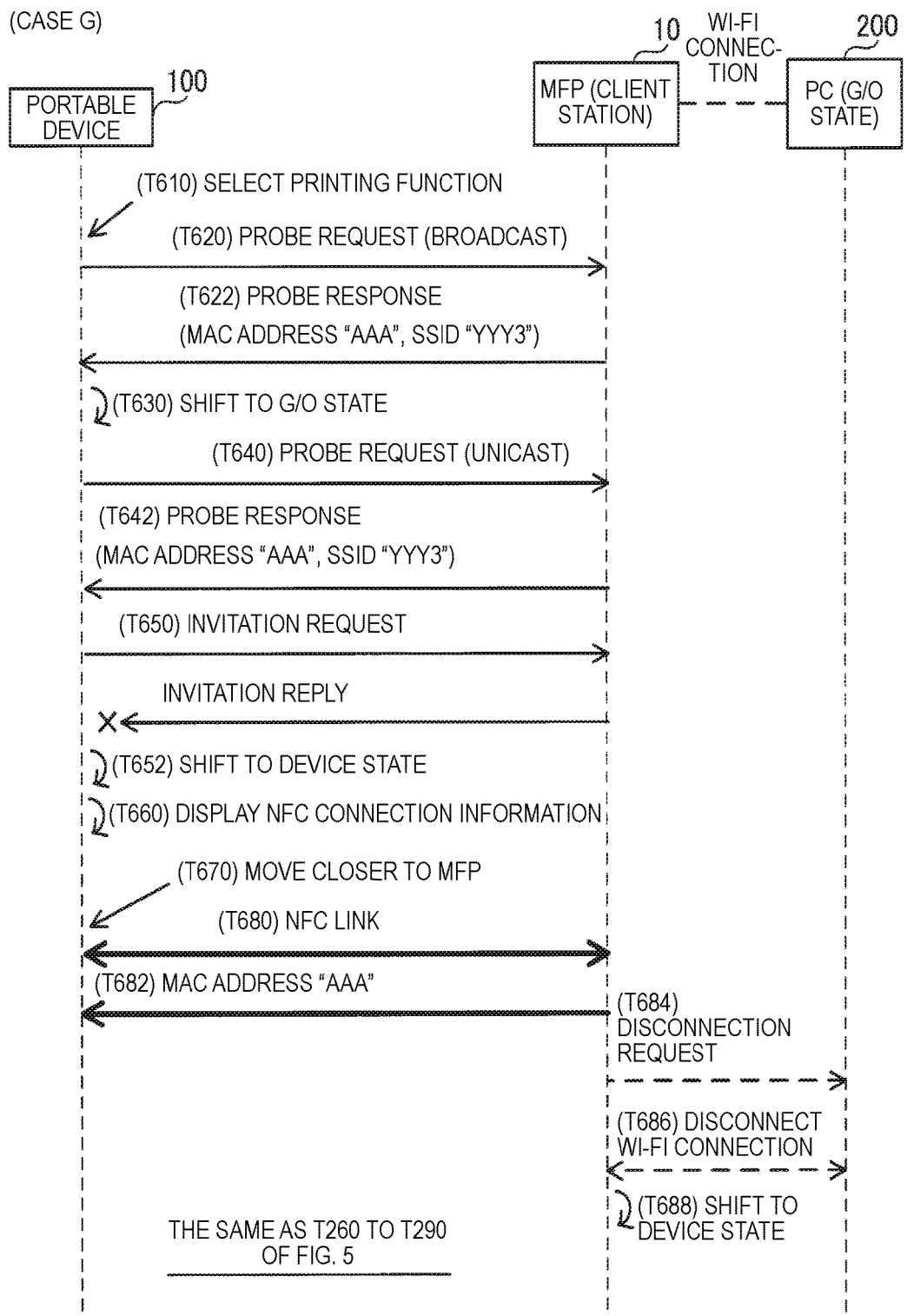
FIG. 8 depicts a sequence diagram of a case G where the Wi-Fi connection is re-established between the MFP and the portable device at a state where the MFP operates as a master station.

(Case G; FIG. 8)

An initial state of a case G is the same as the initial state of FIG. 7 but is different from the processing of FIG. 7, in that a third WFDNW where the MFP 10 operates as the master station is formed and the PC 200 takes part in the third WFDNW, as the client station. In the meantime, the upper limit number of the client stations capable of participating in the third WFDNW is "1".

The processing of T610 is the same as that of T210 of FIG. 5. The processing of T620 to T642 is the same as that of T30 to T52 of FIG. 3. However, the Probe response of T622 and T642 includes the MAC address "AAA", and the SSID "YYY3" that is to be used for the third WFDNW. The processing of T650 is the same as that of T284 of FIG. 5. When the MFP 10 operates at the G/O state, the MFP 10 does not transmit the Invitation reply to the portable device 100 even though it receives the Invitation request from the portable device 100.

Since the portable device 100 does not receive the Invitation reply in response to the transmission of the Invitation request, the portable device determines that the establishment of the Wi-Fi connection with the MFP 10 fails (NO in S60 of FIG. 2), and shifts from the G/O state to the device state in T652 (S62). The processing of T660 to T682 is the same as that of T230 to T252 of FIG. 5.

When the NFC link with the portable device 100 is established, the MFP 10 transmits a disconnection request to the PC 200 in T684, and disconnects the Wi-Fi connection with the PC 200 in T686. Then, in T688, the MFP 10 shifts from the G/O state to the device state. Thereafter, the same processing as T260 to T290 of FIG. 5 is executed, so that the Wi-Fi connection is established between the MFP 10 and the portable device 100.

(Advantages of Case G)

In a situation where the MFP 10 operates at the G/O state and the Wi-Fi connection with the upper limit number of the client stations is established, the portable device 100 cannot establish the Wi-Fi connection with the MFP 10. According to this illustrative embodiment, when it is determined that the establishment of the Wi-Fi connection with the MFP 10 fails (NO in S60), the portable device 100 determines that the MFP 10 has the NFCHO function (YES in S64), and displays the NFC connection information (T660). Thereby, since the user brings the portable device 100 close to the MFP 10, the MFP 10 shifts to the device state (T688), so that the portable device 100 can appropriately re-establish the Wi-Fi connection with the MFP 10.

The portable device 100 and the MFP 10 are examples of the "communication apparatus" and the "external apparatus", respectively. The Wi-Fi I/F 120 and the NFC I/F 122 are examples of the "first wireless interface" and the "second wireless interface", respectively. The WFD method and the NFC method are examples of the "first wireless communication method" and the "second wireless communication method", respectively. The Wi-Fi connection and the NFC link are examples of the "first wireless connection" and the "second wireless connection", respectively. The search operation information and the NFC establishment information are examples of the "first trigger information", and the function selection information is an example of the "second trigger information". The transmission instruction of S12 and S34 and the connection request instruction of S22 in FIG. 2 are examples of the "first connection instruction". The transmission instruction of S42 and the connection request instruction of S52 are examples of the "second connection instruction". The transmission instruction of S34 and the connection request instruction of S22 are examples of the "third connection instruction". The NFC connection information and the MFP operation information are examples of the "first display information" and the "second display information", respectively. The model information "touch panel type" of the MFP 50 and the model information "non-touch panel type" of the MFP 60 are examples of the "first model information" and the "second model information", respectively. The operation associated with the message in the first MFP operation information and the operation associated with the message in the second MFP operation information are examples of the "first operation" and the "second operation", respectively. The NFCHO function is an example of the "function".

The device state is an example of the "first state" (enable state). The state that is not any one of the three states of the WFD method, the CL state, and the G/O state are examples of the "second state" (disable state). The first WFDNW is an example of the "wireless network". The Probe request that is transmitted in S42 of FIG. 2 and the Probe response that is received in S44 are examples of the "first request signal" and the "first reply signal", respectively. The Invitation request that is transmitted in S52 and the Invitation reply that is received in S52 are examples of the "second request signal" and the "second reply signal", respectively.

Although the specific examples of the disclosure have been described in detail, they are just exemplary and do not limit the claims. The technology defined in the claims include a variety of changes and modifications to the specific examples. Modified embodiments of the above illustrative embodiments are enumerated as follows.

Modified Embodiment 1

The model information may include a model name of the target device. In this case, the application 138 may be configured to display the MFP operation information suitable for the model name of the target device on the display unit 114. Also, the application 138 may be configured to divide the target devices into groups by a plurality of model names and to display the MFP operation information suitable for each group on the display unit 114. For example, when the model names are "X1" to "X3", third MFP operation information is displayed, and when the model names are "X4" to "X6", fourth MFP operation information is displayed.

Modified Embodiment 2

The portable device 100 may not have the NFC I/F 122. In this case, S30 to S38, S64 and S66 of FIG. 2 may be omitted. In this case, the "third supply unit" may be omitted. In this modified embodiment, the model information "touch panel type" of the MFP 50 and the model information "non-touch panel type" of the MFP 60 are respectively the "first device information" and the "second device information". Also, the first MFP operation information and the second MFP operation information are examples of the "first display information" and the "second display information", respectively.

Modified Embodiment 3

In the above illustrative embodiments, the target device takes part in the WFDNW where the portable device 100 operates as the master station, so that the Wi-Fi connection is established between the portable device 100 and the target device. Instead of this configuration, the portable device 100 may take part in the WFDNW where the target device operates as the master station, as the client station, so that the Wi-Fi connection is established between the portable device 100 and the target device. In this modified embodiment, the Wi-Fi connection by which the portable device 100 operates as the client station of the WFDNW is the "first wireless connection".

Modified Embodiment 4

The application 138 may execute the processing of S24 when the determination result in S36 of FIG. 2 is YES. Generally speaking, the "transmission unit" may transmit the device information request to the external apparatus with respect to the "second case".

Modified Embodiment 5

The "communication apparatus" is not limited to the portable device 100 and may be a printer, a scanner, an MFP, a stationary PC, a server or the like. The "external apparatus" is not limited to the MFP 10 and may be a printer, a scanner, a portable device, a stationary PC, a server or the like.

Also, the technical elements described in the specification or drawings exhibit the technical usefulness individually or by a variety of combinations and are not limited to combinations defined in the claims upon the filing of the subject application. Also, the technologies described in the specification or drawings accomplish a plurality of purposes at the same time, and one accomplishment of the purposes also has the technical usefulness.

What is claimed is:

1. A non-transitory computer-readable medium storing a computer program readable by a computer of a communication apparatus, the computer program, when executed by the computer, causing the communication apparatus to perform operations comprising:
   in response to receiving first trigger information for establishing first wireless connection with an external apparatus in accordance with a first wireless communication method, supplying, to a first wireless interface, a first connection instruction for establishing the first wireless connection with the external apparatus;
   in response to receiving the first trigger information, storing device information relating to the external apparatus into a memory of the communication apparatus;
   in response to receiving second trigger information for re-establishing the first wireless connection with the external apparatus after the first wireless connection is disconnected, supplying, to the first wireless interface, a second connection instruction for re-establishing the first wireless connection with the external apparatus; and
   in a specific case where it is not possible to re-establish the first wireless connection with the external apparatus even though the second connection instruction is supplied to the first wireless interface, displaying, on a display of the communication apparatus, display information for re-establishing the first wireless connection with the external apparatus,
   wherein the displaying of the display information comprises:

in a case where the device information in the memory is first device information, displaying, on the display, first display information that is the display information indicative of a first method for re-establishing the first wireless connection with the external apparatus; and in a case where the device information in the memory is second device information that is different from the first device information, displaying, on the display, second display information that is the display information indicative of a second method for re-establishing the first wireless connection with the external apparatus, the second method being different from the first method, wherein the first device information indicates that the external apparatus has a function of shifting from a second state to a first state in response to the external apparatus establishing second wireless connection with the communication apparatus in accordance with a second wireless communication method that is different from the first wireless communication method, the second state being a state where it is not possible to establish the first wireless connection with the communication apparatus in accordance with the first wireless communication method, the first state being a state where it is possible to establish the first wireless connection with the communication apparatus in accordance with the first wireless communication method, wherein the second device information indicates that the external apparatus does not have the function, wherein a distance in which wireless communication is possible in accordance with the second wireless communication method is shorter than a distance in which wireless communication is possible in accordance with the first wireless communication method, wherein the first method comprises bringing the communication apparatus close to the external apparatus, wherein the second method comprises executing an operation for the external apparatus to shift the external apparatus from the second state to the first state, and wherein the operations further comprise:

in response to the second wireless connection in accordance with the second wireless communication method being established via a second wireless interface of the communication apparatus after the first display information is displayed on the display, supplying, to the first wireless interface, a third connection instruction for re-establishing the first wireless connection with the external apparatus.

2. The non-transitory computer-readable medium according to claim 1, wherein the second device information comprises model information for specifying a model of the external apparatus, wherein the displaying of the display information comprises:

when the device information in the memory is the second device information and the second device information comprises first model information, displaying, on the display, the second display information indicative of the second method for executing a first operation for the external apparatus having the first model information to shift the external apparatus from the second state to the first state, and when the device information in the memory is the second device information and the second device information comprises second model information that is different from the first model information, displaying, on the display, the second display information indicative of the second method for executing a second operation for the external apparatus having the second model information to shift the external apparatus from the second state to the first state, the second operation being different from the first operation.

3. The non-transitory computer-readable medium according to claim 1, wherein the second state comprise a state where the external apparatus, which does not operate as any one of a master station and a client station of a wireless network, cannot perform predetermined wireless communication for establishing the first wireless connection with the communication apparatus in accordance with the first wireless communication method, and wherein the first state comprises a state where the external apparatus, which does not operate as any one of a master station and a client station of a wireless network, can perform the predetermined wireless communication.

4. The non-transitory computer-readable medium according to claim 1, wherein the second state comprises a state where the external apparatus operates as a master station or a client station of a wireless network, and wherein the first state comprises a state where the external apparatus does not operate as any one of a master station and a client station of a wireless network.

5. The non-transitory computer-readable medium according to claim 1, wherein the first wireless connection is a wireless connection in which the communication apparatus operates as a master station of a wireless network and the external apparatus operates as a client station of the wireless network.

6. The non-transitory computer-readable medium according to claim 1, wherein the second connection instruction comprises an instruction for causing the first wireless interface to transmit a first request signal, and wherein the specific case comprises a case where even though the first wireless interface transmits the first request signal, a first reply signal to the first request signal is not received from the external apparatus.

7. The non-transitory computer-readable medium according to claim 6, wherein the second connection instruction further comprises an instruction for causing the first wireless interface to transmit a second request signal, in response to receiving, from the external apparatus, the first reply signal to the first request signal, and wherein the specific case comprises a case where a second reply signal to the second request signal is not received from the external apparatus even though the first wireless interface has transmitted the second request signal.

8. A non-transitory computer-readable medium storing a computer program readable by a computer of a communication apparatus, the computer program, when executed by the computer, causing the communication apparatus to perform operations comprising:

in response to receiving first trigger information for establishing first wireless connection with an external apparatus in accordance with a first wireless communication method, supplying, to a first wireless interface, a first connection instruction for establishing the first wireless connection with the external apparatus;

in response to receiving the first trigger information, storing device information relating to the external apparatus into a memory of the communication apparatus;

in response to receiving second trigger information for re-establishing the first wireless connection with the external apparatus after the first wireless connection is disconnected, supplying, to the first wireless interface, a second connection instruction for re-establishing the first wireless connection with the external apparatus; and in a specific case where it is not possible to re-establish the first wireless connection with the external apparatus even though the second connection instruction is supplied to the first wireless interface, displaying, on a display of the communication apparatus, display information for re-establishing the first wireless connection with the external apparatus, wherein the displaying of the display information comprises:

in a case where the device information in the memory is first device information, displaying, on the display, first display information that is the display information indicative of a first method for re-establishing the first wireless connection with the external apparatus; and in a case where the device information in the memory is second device information that is different from the first device information, displaying, on the display, second display information that is the display information indicative of a second method for re-establishing the first wireless connection with the external apparatus, the second method being different from the first method, wherein the operations further comprise:

for a first case where the first trigger information is received and the first wireless connection is established with the external apparatus, transmitting a device information request to the external apparatus via the first wireless interface by using the first wireless connection, the device information request being for requesting the external apparatus to transmit the device information; and in response to transmitting the device information request, receiving the device information from the external apparatus via the first wireless interface by using the first wireless connection, and wherein for the first case, the storing of the device information comprises storing the received device information in the memory, wherein the first device information indicates that the external apparatus has a function of shifting from a second state to a first state in response to the external apparatus establishing second wireless connection with the communication apparatus in accordance with a second wireless communication method that is different from the first wireless communication method, the second state being a state where it is not possible to establish the first wireless connection with the communication apparatus in accordance with the first wireless communication method, the first state being a state where it is possible to establish the first wireless connection with the communication apparatus in accordance with the first wireless communication method, wherein the second device information indicates that the external apparatus does not have the function, wherein a distance in which wireless communication is possible in accordance with the second wireless communication method is shorter than a distance in which wireless communication is possible in accordance with the first wireless communication method, wherein the transmitting of the device information request comprises:

transmitting the device information request to the external apparatus for the first case where the first trigger information, which indicates that an user interface of the communication apparatus receives a predetermined operation, is received and the first wireless connection is established with the external apparatus; and not to transmit the device information request to the external apparatus for a second case where the first trigger information, which indicates that the second wireless connection is established with the external apparatus via a second wireless interface of the communication apparatus in accordance with the second wireless communication method, is received and the first wireless connection is established with the external apparatus, and wherein for the second case, the storing of the device information comprises storing the first device information into the memory even when the device information is not received from the external apparatus.

9. A communication apparatus comprising:
a first wireless interface;
a second wireless interface,
an user interface;
a display;
a memory; and
a controller configured to:

in response to receiving first trigger information for establishing first wireless connection with an external apparatus in accordance with a first wireless communication method, supply, to the first wireless interface, a first connection instruction for establishing the first wireless connection with the external apparatus;

in response to receiving the first trigger information, store device information relating to the external apparatus into the memory;

in response to receiving second trigger information for re-establishing the first wireless connection with the external apparatus after the first wireless connection is disconnected, supply, to the first wireless interface, a second connection instruction for re-establishing the first wireless connection with the external apparatus; and in a specific case where it is not possible to re-establish the first wireless connection with the external apparatus even though the second connection instruction is supplied to the first wireless interface, display, on the display, display information for re-establishing the first wireless connection with the external apparatus, wherein in the displaying of the display information, the controller is configured to:

in a case where the device information in the memory is first device information, display, on the display, first display information that is the display information indicative of a first method for re-establishing the first wireless connection with the external apparatus; and in a case where the device information in the memory is second device information that is different from the first device information, display, on the display, second display information that is the display information indicative of a second method for re-establishing the first wireless connection with the external apparatus, the second method being different from the first method, wherein the first device information indicates that the external apparatus has a function of shifting from a second state to a first state in response to the external apparatus establishing second wireless connection with the communication apparatus in accordance with a second wireless communication method that is different from the first wireless communication method, the second state being a state where it is not possible to establish the first wireless connection with the communication apparatus in accordance with the first wireless communication method, the first state being a state where it is possible to establish the first wireless connection with the communication apparatus in accordance with the first wireless communication method, wherein the second device information indicates that the external apparatus does not have the function, wherein a distance in which wireless communication is possible in accordance with the second wireless communication method is shorter than a distance in which wireless communication is possible in accordance with the first wireless communication method, wherein the first method comprises bringing the communication apparatus close to the external apparatus, wherein the second method comprises executing an operation for the external apparatus to shift the external apparatus from the second state to the first state, and wherein the controller is further configured to:
in response to the second wireless connection in accordance with the second wireless communication method being established via the second wireless interface after the first display information is displayed on the display, supply, to the first wireless interface, a third connection instruction for re-establishing the first wireless connection with the external apparatus.

10. The communication apparatus according to claim 9, wherein the first wireless connection is a wireless connection in which the communication apparatus operates as a master station of a wireless network and the external apparatus operates as a client station of the wireless network.

11. The communication apparatus according to claim 9,
wherein the second connection instruction comprises an instruction for causing the first wireless interface to transmit a first request signal, and
wherein the specific case comprises a case where even though the first wireless interface transmits the first request signal, a first reply signal to the first request signal is not received from the external apparatus.

12. The communication apparatus according to claim 9,
wherein the controller is further configured to:
for a first case where the first trigger information is received and the first wireless connection is established with the external apparatus, transmit a device information request to the external apparatus via the first wireless interface by using the first wireless connection, the device information request being for requesting the external apparatus to transmit the device information; and
in response to transmitting the device information request, receive the device information from the external apparatus via the first wireless interface by using the first wireless connection, and
wherein for the first case, the storing of the device information comprises storing the received device information in the memory.

* * * * *